US012761812B2

(12) United States Patent
Jung

(10) Patent No.: US 12,761,812 B2
(45) Date of Patent: Oct. 13, 2026

(54) ELECTRONIC DEVICE AND A METHOD FOR PROTECTING AN ASIL MEMORY AREA

(71) Applicant: HYUNDAI AUTOEVER CORP., Seoul (KR)

(72) Inventor: Ji Hoon Jung, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 0 days.

(21) Appl. No.: 18/987,152

(22) Filed: Dec. 19, 2024

(65) Prior Publication Data

US 2025/0208770 A1 Jun. 26, 2025

(30) Foreign Application Priority Data

Dec. 26, 2023 (KR) ........................ 10-2023-0191272

(51) Int. Cl.
*G06F 3/06* (2006.01)

(52) U.S. Cl.
CPC .......... *G06F 3/0622* (2013.01); *G06F 3/0637* (2013.01); *G06F 3/0673* (2013.01)

(58) Field of Classification Search
None
See application file for complete search history.

(56) References Cited

U.S. PATENT DOCUMENTS 8,312,249 B1 * 11/2012 Trumbull .............. G06F 9/4484 711/206
10,860,486 B2 12/2020 Hayakawa
2012/0191933 A1 * 7/2012 Zbiciak ............... G06F 12/1458 711/163
2013/0305006 A1 * 11/2013 Altman ................. G06F 3/0679 711/163
2018/0203823 A1 * 7/2018 Ito ......................... G06F 15/167
2019/0102296 A1 * 4/2019 Natarajan ........... G06F 12/0895
2019/0196984 A1 * 6/2019 Lasko ..................... G06F 21/79
2019/0258812 A1 8/2019 Wolf
2019/0391927 A1 * 12/2019 Tsirkin .................. G06F 12/145
2022/0188222 A1 * 6/2022 Hashimoto ......... G06F 12/0261
2023/0185904 A1 6/2023 Chitnis
2024/0134709 A1 * 4/2024 Mansbart ................ G06F 9/544
2025/0173178 A1 * 5/2025 Zhang ................ G06F 16/2343

FOREIGN PATENT DOCUMENTS

JP 2017016410 A * 1/2017
KR 20190100074 A 8/2019

* cited by examiner

*Primary Examiner* — Jared I Rutz
*Assistant Examiner* — Elias Young Kim
(74) *Attorney, Agent, or Firm* — Lempia Summerfield Katz LLC

(57) ABSTRACT

An electronic device for protecting an automotive safety integrity level (ASIL) memory area includes a memory configured to be partitioned into an ASIL area and a quality management (QM) area; at least one flag; and a QM module. The QM module is configured to set the flag to a first value; perform memory access of writing or reading data in certain areas of the ASIL area; and set the flag to a second value after having performed the memory access. The electronic device also includes an ASIL module configured to deactivate a memory protection unit (MPU), which monitors access to the memory, when the flag is set to the first value. The ASIL module is also configured to activate the MPU or maintain a state of the MPU when the flag is set to the second value.

15 Claims, 8 Drawing Sheets

ELECTRONIC DEVICE AND A METHOD FOR PROTECTING AN ASIL MEMORY AREA

CROSS REFERENCE TO RELATED APPLICATION

This application claims the benefit of and priority to Korea Patent Application No. 10-2023-0191272, filed on Dec. 26, 2023, the entire disclosure of which is incorporated herein by reference.

FIELD OF TECHNOLOGY

The present disclosure relates to a technology of protecting an automotive safety integrity level (ASIL) memory area. More particularly, the present disclosure relates to an electronic device and a method for protecting an ASIL memory area when a quality management (QM) module accesses the ASIL area in a memory on an automotive open system architecture (AUTOSAR) platform.

BACKGROUND

Conventional automobiles were assemblies of mechanical apparatuses. However, modern automobiles are assemblies of various electronic apparatuses because automobiles in these days are equipped with more and more electronic apparatuses. Because functions, such as a vehicle stability control, an automated parking, an intelligent driving assistance, and an autonomous driving, are being generalized, more electronic apparatuses are installed inside a vehicle to operate by linking with each other.

The more electronic devices are used in an automobile, the greater requirements for standardizing software used for automobiles become. Accordingly, for increasing reusability of software modules and compatibility of components of respective automobiles, embedded software open platforms, referred to as automotive open system architecture (AUTOSAR) platforms, have been developed and are widely used.

An AUTOSAR platform may comprise an application layer to perform specific functions such as an automobile engine control, a basic software (BSW) layer to provide services for performing operations requiring the application layer, and a runtime environment (RTE) layer to provide a data exchange interface between the application layer and the basic software layer.

Basic software executed in an AUTOSAR platform decomposes an automotive safety integrity level (ASIL) function into an ASIL function associated with the safety and a quality management (QM) function associated with the quality and maintains their independences to satisfy the entire ASIL requirements.

The discussions in this section are intended merely to provide background information and do not constitute an admission of prior art.

SUMMARY

In an aspect, the present disclosure provides an electronic device and a method for protecting an ASIL memory area, which manage memory access authority to an ASIL area by including multiple flags.

In another aspect, the present disclosure provides an electronic device and a method for protecting an ASIL memory area, which disperse multiple flags in order to ensure the integrity of the flags used as state variables for memory access authority.

Technological tasks of the present disclosure are not limited to those mentioned above. Other technological tasks that are not mentioned above should be more clearly understood by a person having ordinary skill in the art to which the present disclosure pertains from the following descriptions.

According to an aspect of the present disclosure, an electronic device for protecting an automotive safety integrity level (ASIL) memory area is provided. The electronic device may include a memory configured to be partitioned into an ASIL area and a quality management (QM) area; at least one flag; a QM module. The QM module is configured to set the at least one flag to a first value; perform memory access of writing or reading data in certain areas of the ASIL area; and set the at least one flag to a second value after having performed the memory access. The electronic device also includes an ASIL module to deactivate a memory protection unit (MPU) configured to monitor access to the memory when the at least one flag is set to the first value. The ASIL module is also configured to activate the MPU or to maintain a state of the MPU when the at least one flag is set to the second value.

In an embodiment, the MPU may generate an exception in a state of being activated when the QM module accesses the ASIL area.

In an embodiment, the at least one flag may include multiple flags. When all the multiple flags are set to the first value, the ASIL module may deactivate the MPU. When at least one of the multiple flags is set to the second value, the ASIL module may activate the MPU.

In an embodiment, the multiple flags comprise a first flag and a second flag. The QM module may access the first flag and the second flag, which are dispersed, at different times to set the first flag and the second flag to the first value.

In an embodiment, the ASIL module may access the ASIL area and the QM area without being authorized.

In an embodiment, when changing set values of the multiple flags, the QM module may notify the change to the ASIL module.

In an embodiment, access of the QM module to the ASIL area may be limited to the certain areas of the ASIL area.

According to another aspect of the present disclosure, a method for protecting an automotive safety integrity level (ASIL) memory area is provided. The method may include setting flags to a first value by a quality management (QM) module. The QM module is accessible to a QM area of a memory. The method may also include checking set values of the flags by an ASIL module. The ASIL module is accessible to an ASIL area of the memory. The method may also include deactivating a memory protection unit (MPU) configured to monitor access to the memory, when the set values of the flags are the first value. The method may also include performing memory access. In the memory, the QM module accesses the ASIL area. The method may also include setting the flags to a second value by the QM module. The method may also include activating the MPU by the ASIL module.

In an embodiment, the method may also include locating the flags in positions spaced apart from each other across registers.

In an embodiment, the QM module may include multiple functions. The method may also include respectively changing set values of the flags by the functions.

In an embodiment, the method may also include locating the flags in the QM area and the ASIL module; and accessing, by the QM module, the flags without being authorized.

In an embodiment, the method may also include forming the QM area and the ASIL area by partitioning one memory device.

In an embodiment, the method may also include setting the ASIL area and the ASIL module to an ASIL D level.

In an embodiment, the method may also include, after checking set values of the flags, activating the MPU or maintaining a state of the MPU when at least one of the flags does not have a set value of the first value.

According to another aspect of the present disclosure, a method for protecting an automotive safety integrity level (ASIL) memory area is provided. The method may include setting flags to a first value by a quality management (QM) module. The QM module is accessible to a QM area of a memory. The method may also include notifying, by the QM module, state changes of the flags to an ASIL module. The ASIL module is accessible to a ASIL area of the memory. The method may also include deactivating, by the ASIL module, a memory protection unit (MPU) configured to monitor access to the memory, when the flags are set to the first value. The method may also include performing memory access. In the memory, the QM module accesses the ASIL area. The method may also include notifying, by the QM module, completion of the memory access to the ASIL module. The method may also include activating the MPU by the ASIL module.

In an embodiment, the method may further include setting, by the QM module, the flags to a second value after notifying, by the QM module, completion of the memory access to the ASIL module.

In an embodiment, the method may further include setting, by the QM module, the flags to a second value before or after notifying, by the QM module, completion of the memory access to the ASIL module.

In an embodiment, the QM module may include multiple functions and the flags may be commonly used by the multiple functions.

In an embodiment, the method may also include locating the flags in registers where there are possibilities to be contaminated in terms of hardware.

In an embodiment, the method may also include generating, by the MPU, an exception in a state of being activated when the QM module access the ASIL area.

The present disclosure may provide an electronic device and a method for protecting an ASIL memory area by including multiple flags to manage memory access authority to an ASIL area.

The present disclosure may provide an electronic device and a method for protecting an ASIL memory area by disposing multiple flags to be dispersed so as to ensure integrity of flags used as state variables for memory access authority.

In addition, the present disclosure provides various effects directly or indirectly understood by the present disclosure.

BRIEF DESCRIPTION OF THE DRAWINGS

In order for one having ordinary skill in the art to understand the present disclosure, various forms of the present disclosure are described given by way of example with reference to the accompanying drawings, in which.

DETAILED DESCRIPTION

Figure 1:
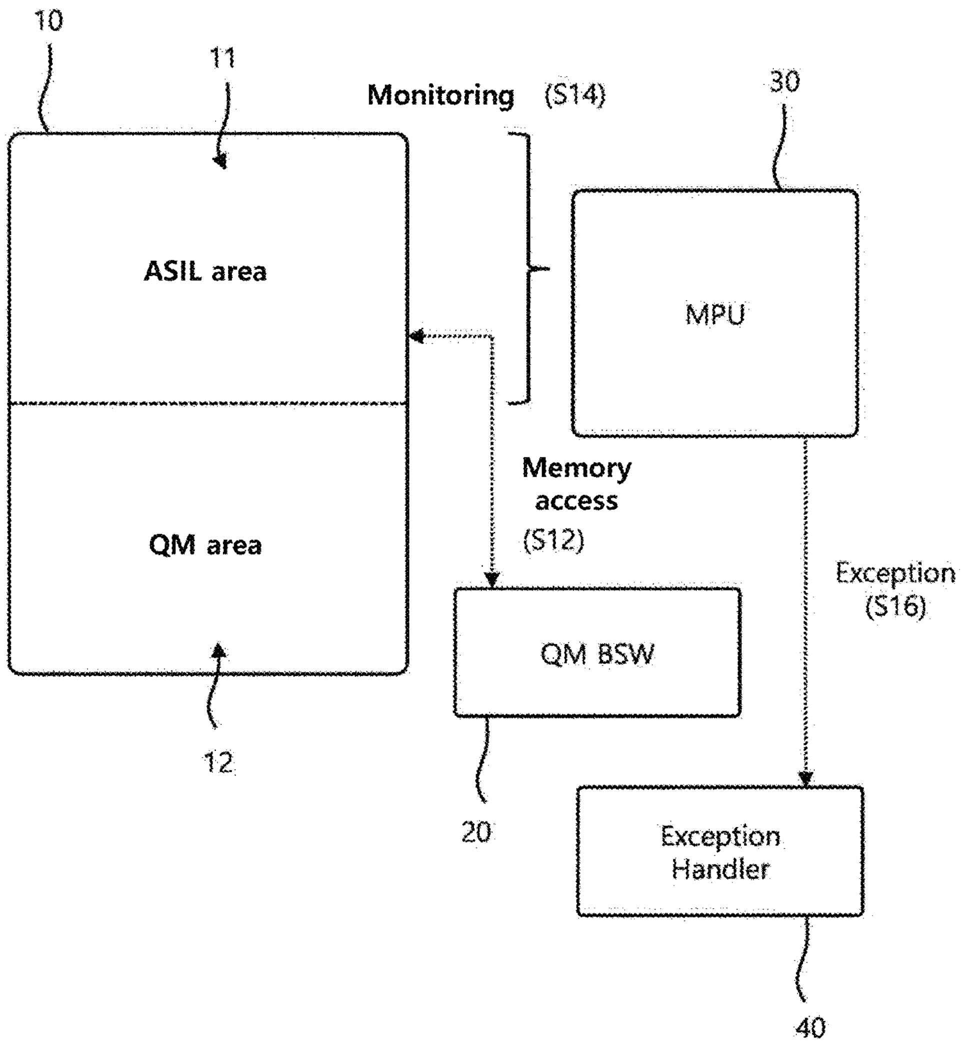
FIG. 1 is a diagram of a first example of a general electronic device for protecting an ASIL memory area.

Hereinafter, embodiments of the present disclosure are described in detail with reference to the accompanying drawings. The advantages and features of the present disclosure and methods of achieving the same should be apparent to those having ordinary skill in the art from the following embodiments that are described in detail with reference to the accompanying drawings. It should be noted, however, that the technical spirit of the present disclosure is not limited to the following embodiments. Rather, the technical ideas of the present disclosure may be implemented in different forms. The embodiments described below are provided to fully, thoroughly, and completely convey the technical spirit of the present disclosure to those having ordinary skill in the technical art to which the present disclosure pertains. The technical spirit of the present disclosure is defined by the scope of the claims.

With regard to the reference numerals of the components of the respective drawings, it should be noted that the same reference numerals are assigned to the same components even when the components are shown in different drawings. In addition, in the following description, when it was determined that a detailed description of a related known technology or function may obscure the gist of the present disclosure, the detailed description thereof has been omitted.

If there is no other definition, all the terms (including both technological and scientific terms) used in the present disclosure have meanings that can be commonly understood by persons having ordinary skill in the art to which the present disclosure pertains. In addition, terms shall not be excessively ideally or perfunctorily interpreted if the terms are not clearly and particularly defined as such. The terms used in the present disclosure are only intended to describe embodiments and are not intended to limit the present disclosure. In the present disclosure, a term in a singular form may also mean a term in a plural form as long as there is no particular indication.

In addition, terms, such as “1st”, “2nd”, “A”, “B”, “(a)”, “(b)”, or the like, may be used in describing the components of the present disclosure. These terms are intended only to distinguish a corresponding component from other components, and the nature, order, or sequence of the corresponding component is not limited to the terms. In the case where a component is described as being “coupled”, “combined”, or “connected” to another component, it should be understood that the corresponding component may be directly coupled or connected to another component or that the corresponding component may also be "coupled", "combined", or "connected" to the component via another component provided therebetween.

It should be noted that terms, such as 'comprise', 'include', etc., are intended to indicate the existence of the described characteristics, numbers, steps, operations, components, parts or their combinations. The terms are not intended to preliminarily exclude the existence of other characteristics, numbers, steps, operations, components, parts or their combinations.

Hereinafter, embodiments of the present disclosure are described with reference to the accompanying drawings. When a component, device, module, element, or the like of the present disclosure is described as having a purpose or performing an operation, function, or the like, the component, device, or element should be considered herein as being "configured to" meet that purpose or perform that operation or function.

An electronic device according to embodiments of the present disclosure may comprise a memory partitioned into an automotive safety integrity level (ASIL) area and a quality management (QM) area; a QM module to perform memory access to carry out functions related to the quality of automotive functions; an ASIL module to perform memory access to carry out functions related to the safety of automobiles; and a memory protection unit (MPU) to monitor memory access.

The ASIL area may be a memory area where codes or data related to the safety of an automobile are stored, and the QM area may be a memory area where codes or data not related to the safety of an automobile, but related to the quality of an automobile are stored. The memory access may include operations of writing or reading data in a memory.

An electronic device according to embodiments of the present disclosure allows basic software executed in an AUTOSAR platform to decompose an ASIL function into an ASIL function associated with the safety and a QM function associated with the quality and maintains their independences to satisfy the entire ASIL requirements.

FIG. 1 is a diagram of a first example of a general electronic device for protecting an ASIL memory area.

Referring to FIG. 1, the first example of a general electronic device for protecting an ASIL memory area may comprise a memory 10 partitioned into an ASIL area 11 and a QM area 12. The general electronic device may also include a QM module 20 to perform memory access to carry out functions related to the quality of automotive functions. The general electronic device may also include an ASIL module to perform memory access to carry out functions related to the safety of an automobile. The general electronic device may also include a memory protection unit (MPU) 30 to monitor memory access. The memory access may include operations of writing or reading codes or data in certain areas of the memory 10.

Because the QM area 12 of the memory 10 is an area where data not related to the safety of an automobile, but related to the quality thereof, is stored, the memory access would not pose significant problems. However, unlike the QM area 12, the ASIL area 11 is an area where codes or data related to the safety of an automobile are stored. Therefore, the memory access needs to be strictly limited and managed.

As an embodiment, the memory protection unit (MPU) 30 may monitor access to the memory and may limit the access of a module without authority to the memory. For example, if the QM module 20 accesses the ASIL area 11 (S12), the memory protection unit 30 monitoring access to the memory may handle such memory access of the QM module 20 by recognizing the access (S14) and generating an exception to provide the exception to an exception handler 40 (S16).

As such, verifying authority of basic software (BSW) for access to the memory on an AUTOSAR platform requires frequent function calls and buffer access for writing among basic software components. Every function call or writing needs to use a system call, which may be a main cause to increase a load on a central processing unit (CPU). For this reason, such an operation may not be applied to software, may put a high load on the CPU, and may be a burden to the overall software performance.

Figure 2:
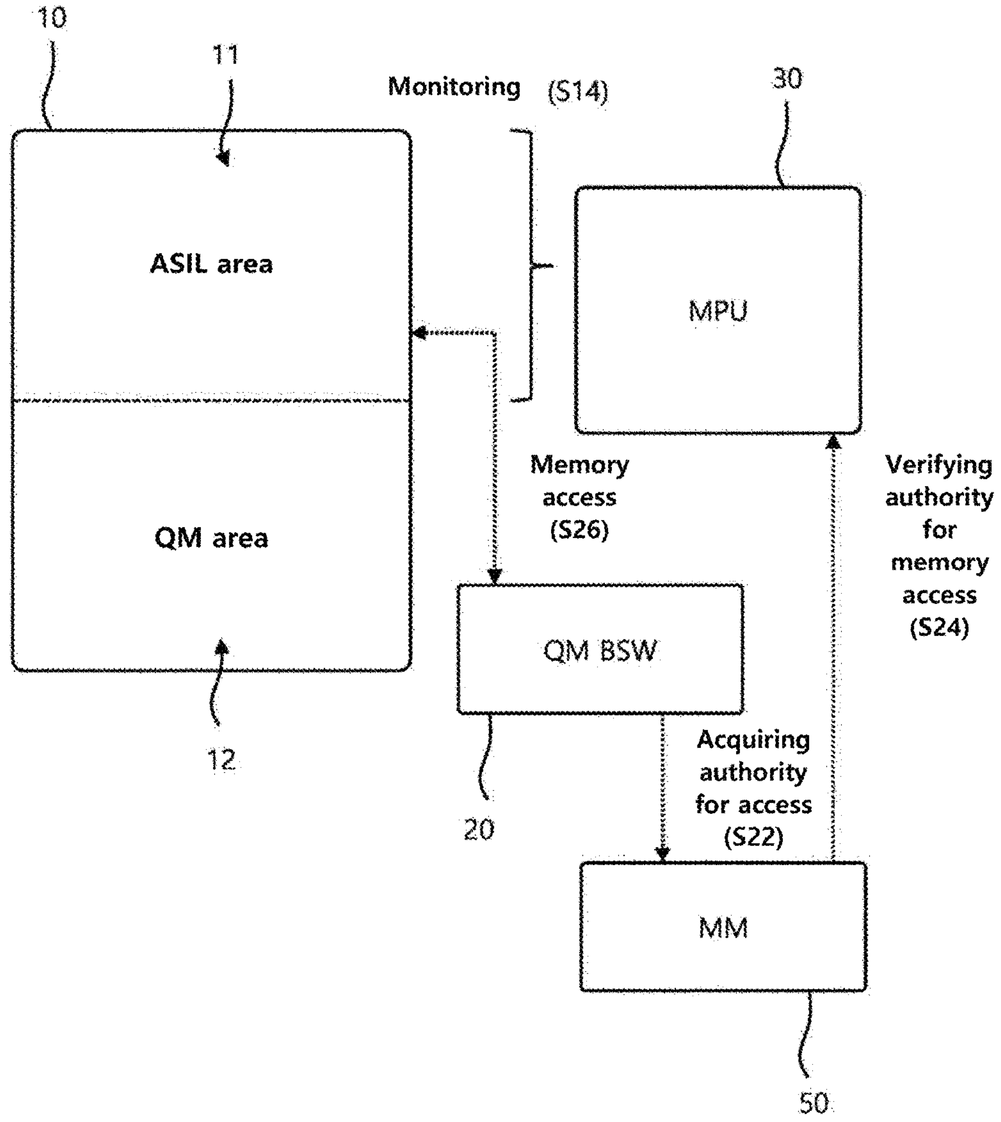
FIG. 2 is a diagram of a second example of a general electronic device for protecting an automotive safety integrity level (ASIL) memory area.

FIG. 2 is a diagram of a second example of a general electronic device for protecting an ASIL memory area.

Referring to FIG. 2, the second example of a general electronic device for protecting an ASIL memory area may comprise a memory 10 partitioned into an ASIL area 11 and a QM area 12. The general electronic device may also include a QM module 20 to perform memory access to carry out functions related to the quality of automotive functions. The general electronic device may also include an ASIL module to perform memory access to carry out functions related to the safety of an automobile. The general electronic device may also include a memory management (MM) module 50 to manage memory access. The general electronic device may also include a memory protection unit (MPU) 30 to monitor memory access and to verify authority for memory access.

In the second example of a general electronic device for protecting an ASIL memory area, because the ASIL area 11 is an area where codes or data related to the safety of an automobile are stored, unlike the QM area 12, the memory access needs to be strictly limited and managed.

As an embodiment, the QM module 20 may acquire authority for access to the memory by the memory management module 50 and may perform memory access to the ASIL area 11. For example, when access to the ASIL area 11 is needed, the QM module 20 may acquire authority for access to the memory from the memory management module 50 (S22). The memory management module 50 may set the memory protection unit 30 to verify authority of the QM module 20 for access to the ASIL area 11 of the memory (S24).

Even when the QM module 20 accesses the ASIL area 11 of the memory while the memory protection unit 30 monitors memory access (S14), because the authority of the QM module 20 for access to the ASIL area 11 has already been verified, the memory protection unit 30 may not generate an exception. Therefore, the QM module 20 may directly access the ASIL 11 (S26).

The second example of a general electronic device for protecting an ASIL memory area may reduce the load on the CPU due to the use of system calls for verifying authority for memory access.

Figure 3:
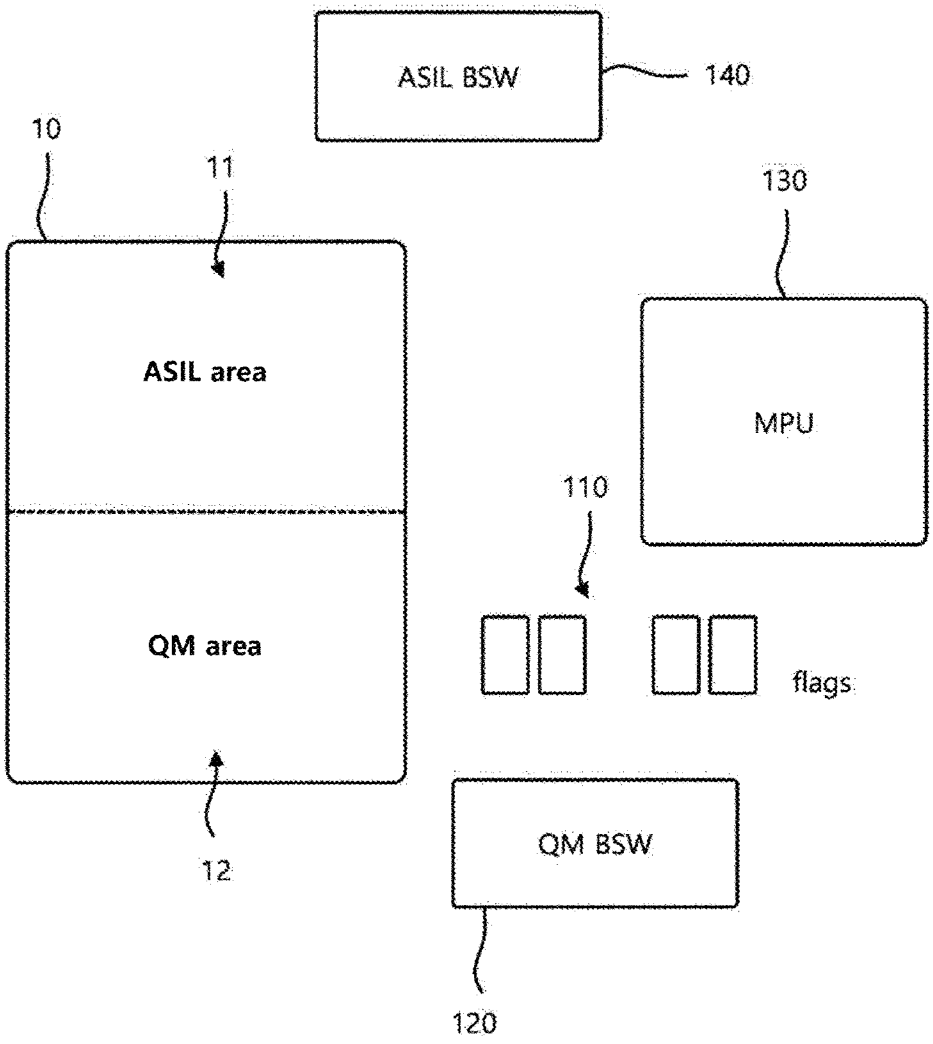
FIG. 3 is a configuration diagram of an electronic device for protecting an ASIL memory area according to an embodiment.

FIG. 3 is a configuration diagram of an electronic device for protecting an ASIL memory area according to an embodiment.

Referring to FIG. 3, the electronic device for protecting an ASIL memory area according to an embodiment may comprise a memory 10, multiple flags 110, a QM module 120, an ASIL module 140, and a memory protection unit (MPU) 130.

The electronic device may be a device performing functions to improve the safety, performance, and convenience of an automobile, such as a vehicle control system, communication and networking, support for autonomous driving functions, infotainment system control, energy management, software updating and maintenance, etc. For example, the electronic device may be a micro controller unit (MCU) for an automobile.

In the memory 10, codes and data for performing functions of the electronic device may be stored. The memory 10 may comprise an ASIL area 11 and a QM area 12. The QM area 12 and the ASIL area 11 may be formed by partitioning one memory device 10, and the ASIL area 11 and the ASIL module 140 may be set to be ASIL D level.

The QM area 12 of the memory 10 may be a memory area where codes or data related to the quality of an automobile are stored. The ASIL area may be a memory area where codes or data related to the safety of an automobile are stored. Because the ASIL area 11 is an area where codes or data related to the safety of an automobile are stored, unlike the QM area 12, the memory access needs to be strictly limited and managed depending on authority for memory access.

The multiple flags 110, which are used to control memory access operations, may be disposed to be dispersed in various locations.

According to an embodiment, although the electronic device may include a single flag to control the memory access operations, multiple flags are desirable. During driving of an automobile, there may be hardware contamination due to internally or externally generated electromagnetic waves, which may cause changes in set values. In order to prevent such hardware contamination, the electronic device may include multiple flags and dispose them to be physically dispersed in various locations.

For example, the multiple flags 110 may be a set of state variables for memory access authority used for controlling memory access operations. The ASIL module 140 and the QM module 120 may access the flags without being authorized.

For example, when the QM module 120 accesses the ASIL area 11 of the memory 10, whether the QM module 120 may perform memory access operations to the ASIL area 11 may be determined based on states of the multiple flags 110. The memory access operations may include writing or reading codes or data in certain areas of the ASIL area 11.

The QM module 120 may be a module to perform functions related to the quality of an automobile. The QM module 120 may perform access operations to the QM area 12 or the ASIL area 11 of the memory 10 in order to carry out functions related to the quality of an automobile.

For example, the QM module 120 may access the QM area 12 of the memory 10 without being authorized to execute basic software (BSW Code) for the functions related to the quality of an automobile.

For example, the QM module 120 may receive authority for memory access through setups of the flags 110 in order to execute basic software (BSW Code) for the functions related to the quality of an automobile and may access the ASIL area 11 of the memory. To do so, the QM module 120 may change state values of the flags 110 using certain values. For example, the QM module 120 may set the flags 110 to a first value and may perform memory access operations of writing or reading data in certain areas of the ASIL area 11.

After having performed the memory access operations, the QM module 120 may set the flags 110 to a second value. The first value and the second value for the flags 110 may be different from each other. For example, if the first value is '1', the second value may be '0'.

For example, when changing the set values of the flags 110, the QM module 120 may notify the change to the ASIL module 140. For example, in order to acquire authority for access to the ASIL area 11, the QM module 120 may change set values of the flags 110 and may notify the change to the ASIL module 140 so that the ASIL module 140 enables the QM module 120 to access the ASIL area 11.

The access of the QM module 120 to the ASIL area 11 may be limited to certain areas of the ASIL area 11. Because the ASIL area 11 is an area where core data and codes related to the safety are stored, the access of the QM module 120 to the ASIL area 11 may be limited to certain areas, which are not related to the safety. This allows the QM module 120 to perform operations related to the quality in the ASIL area 11 while keeping the safety and integrity of the ASIL area 11.

The QM module 120 may include multiple functions and the set values of the flags 110 may be changed by the respective functions.

The ASIL module 140 may be a module to perform memory access operations to carry out functions related to the safety of an automobile. For example, the ASIL module 140 may access the ASIL area 11 and the QM area 12 without being authorized to carry out functions related to the safety of an automobile.

For example, the ASIL module 140 may enable the QM module to access the ASIL area 11. When the QM module 120 changes the set values of the flags 110 for secure authority for access to the ASIL area 11, the ASIL module 140 may check the set values of the flags 110 and may enable the QM module 120 to access the ASIL area 11. For example, when the flags 110 are set to the first value by the QM module 120, the ASIL module 140 may deactivate the memory protection unit (MPU) 130, which monitors memory access so that the QM module 120 may access the ASIL area 11.

In the electronic device according to an embodiment, when there are multiple flags and more than half of the multiple flags 110 are set to the first value, the memory protection unit (MPU) 130 may be deactivated. Additionally, when all of the multiple flags 110 are set to the first value, the memory protection unit (MPU) 130 may also be deactivated. This enables securing integrity for the authority of the QM module 120 for memory access.

For example, when the QM module 120 has completed the memory access operation to the ASIL area 11, the ASIL module 140 may retrieve the memory access authority for the QM module 120. When the QM module 120 has completed the memory access operation and changes the set values of the flags 110, the ASIL module 140 may check the set values of the flags 110 and may retrieve the memory access authority for the QM module 120. For example, when the flags 110 are set to the second value by the QM module 120, the ASIL module may retrieve the memory access authority for the QM module 120 by re-activating the memory protection unit (MPU) 130, which monitors memory access.

For example, when at least one of the flags is set to the second value, the ASIL module 140 may activate the memory protection unit (MPU) 130 or may maintain the state of the memory protection unit (MPU) 130. The first value and the second value for the flags may be different from each other. For example, the first value may be '1' and the second value may be '0'.

The memory protection unit (MPU) 130, which is a component of an electronic device for protecting memory areas, may monitor memory access operations and may control memory access authority.

For example, when the QM module 120 accesses the ASIL area 11 in a state where the memory protection unit (MPU) 130 is deactivated, an exception may not be generated. Even when the QM module 120 accesses the ASIL area 11 in a state where the memory protection unit (MPU) 130 is deactivated, the memory protection unit (MPU) 130 may not detect the access and may not generate an exception. As such, the QM module 120 may access the ASIL area 11 without causing an exception to be generated by the memory protection unit (MPU) 130.

For example, when the QM module 120 accesses the ASIL area 11 in a state where the memory protection unit (MPU) 130 is activated, an exception may be generated. When the QM module 120 accesses the ASIL area 11 in a state where the memory protection unit (MPU) 130 is activated, the memory protection unit (MPU) 130 may detect the access, may block the access, and may generate an exception to provide the exception to an exception handler 40. As such, the QM module 120 is blocked to access the ASIL area 11 and may not access the ASIL area 11 without causing an exception to be generated by the memory protection unit (MPU) 130.

Figure 4:
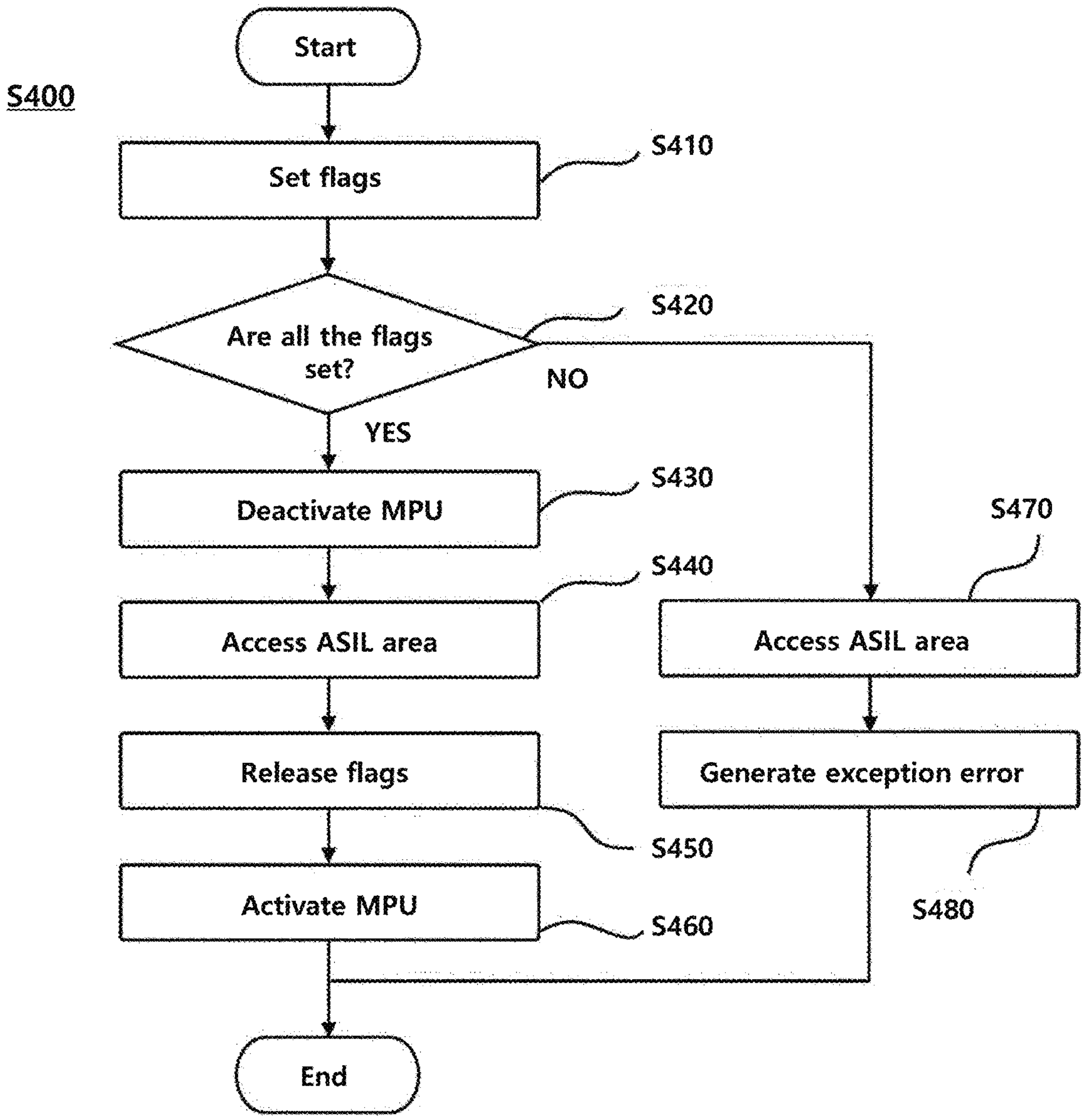
FIG. 4 is a flow diagram of a method for protecting an ASIL memory area in an electronic device according to an embodiment.

FIG. 4 is a flow diagram of a method for protecting an ASIL memory area in an electronic device according to an embodiment.

Referring to FIG. 4, the method for protecting an ASIL memory area in an electronic device according to an embodiment may include steps of: setting flags (S410), checking the flags (S420), deactivating a memory protection unit (MPU) (S430), accessing an ASIL area (S440), releasing the flags (S450), and activating the MPU (S460).

The flags 110 may be located in positions spaced apart from each other across registers or may be located in the QM area 12. The ASIL module 140 and the QM module 120 may access the flags 110 without being authorized. The QM area 12 and the ASIL area 11 may be formed by partitioning one memory device 10, and the ASIL area 11 and the ASIL module 140 may be set to an ASIL D level. The QM module 120 may include multiple functions, and the set values of the flags 110 may be changed by the respective functions.

The step of setting flags (S410) may be a step of setting the flags 110 to the first value by the QM module 120. The QM module 120 may access the QM area 12 without being authorized and may access the ASIL area 11 after being authorized.

The step of checking the flags (S420) may be a step of checking whether the values of the flags 110 are set by the ASIL module 140. The ASIL module 140 may access the ASIL area 11 and the QM area 12, without being authorized, to carry out functions related to the safety of an automobile.

The step of deactivating the MPU (S430) is a step of deactivating the memory protection unit (MPU) 130 when the values of the flags 110 are set by the ASIL module 140 (YES in S420) and the set values of the flags are the first value. For example, in step S430, the ASIL module 140 may deactivate the memory protection unit (MPU) 130, which monitors memory access, when checking that the set values of the flags 110 are '1'.

The step of accessing the ASIL area (S440) may be a step in which the QM module 120 accesses the ASIL area 11. In order that the QM module 120 may perform operations related to the quality while keeping the safety and integrity of the ASIL area 11, the access of the QM module 120 to the ASIL area 11 may be limited to certain areas of the ASIL area 11.

The step of releasing the flags (S450) may be a step in which the QM module 120 sets the flags 110 to the second value after having completed the access to the ASIL area 11. The step of releasing the flags (S450) may include notifying by the QM module 120 to the ASIL module 140 the completion of access of the QM module 120 to the ASIL area 11.

The step of activating the memory protection unit (S460) may be a step in which the ASIL module 140 activates the memory protection unit (MPU) 130.

When at least one of the flags 110 is revealed not to have the first value as a set value after the step of checking the set values of the flags (NO in S420), the memory protection unit (MPU) 130 may be activated, or the method may further include maintaining a state of the memory protection unit (MPU) 130. When the QM module 120 accesses the ASIL area 11 (S470), the memory protection unit (MPU) 130, in its activated state, may generate an exception (S480).

Figure 5:
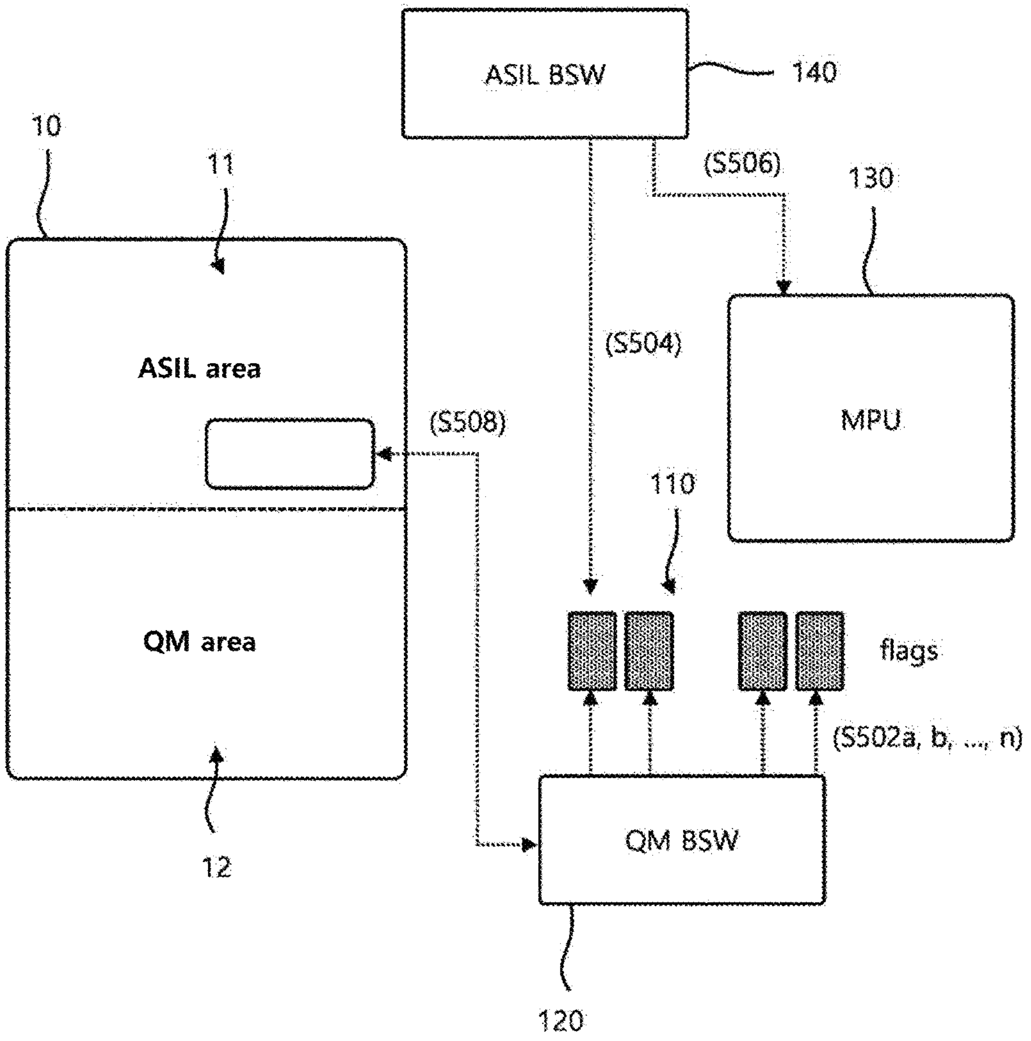
FIG. 5 is a flow diagram of a first example of control of an electronic device according to an embodiment.

FIG. 5 is a flow diagram of a first example of control of an electronic device according to an embodiment.

By referring to FIG. 5, the process, in which the QM module 120 sets the flags 110 and the ASIL module 140 checks the flags 110 and deactivates the memory protection unit (MPU) 130, is described below.

The QM module 120 may sets the multiple flags 110 to the first value (S502*a*, S502*b*, . . . S502*n*) in order to acquire authority for access to the ASIL area 11. For example, the QM module 120 may request authority for access by setting the flags 110 to '1' so that the memory protection unit 130 may allow the QM module 120 to access the ASIL area 11.

When it is verified that all of the multiple flags are set to the first value through checking the set values of the flags 110 by the ASIL module 140 (S504), the ASIL module 140 may deactivate the memory protection unit 130 (S506). For example, when it is revealed that the set values of the flags 110 are '1' through the verification of the ASIL module 140, the ASIL module 140 may consider this as a request from the QM module 120 for authority for access to the ASIL area 11. Additionally, when the ASIL module has verified that the set values of the flags 110 are '1', the ASIL module 140 may deactivate the memory protection unit 130, which monitors memory access.

The QM module 120, that accesses the ASIL area 11 of the memory 10, may perform memory access operations, i.e., may read or write data or codes required for executing basic software (BSW Code) for the functions related to the quality of an automobile (S508).

Figure 6:
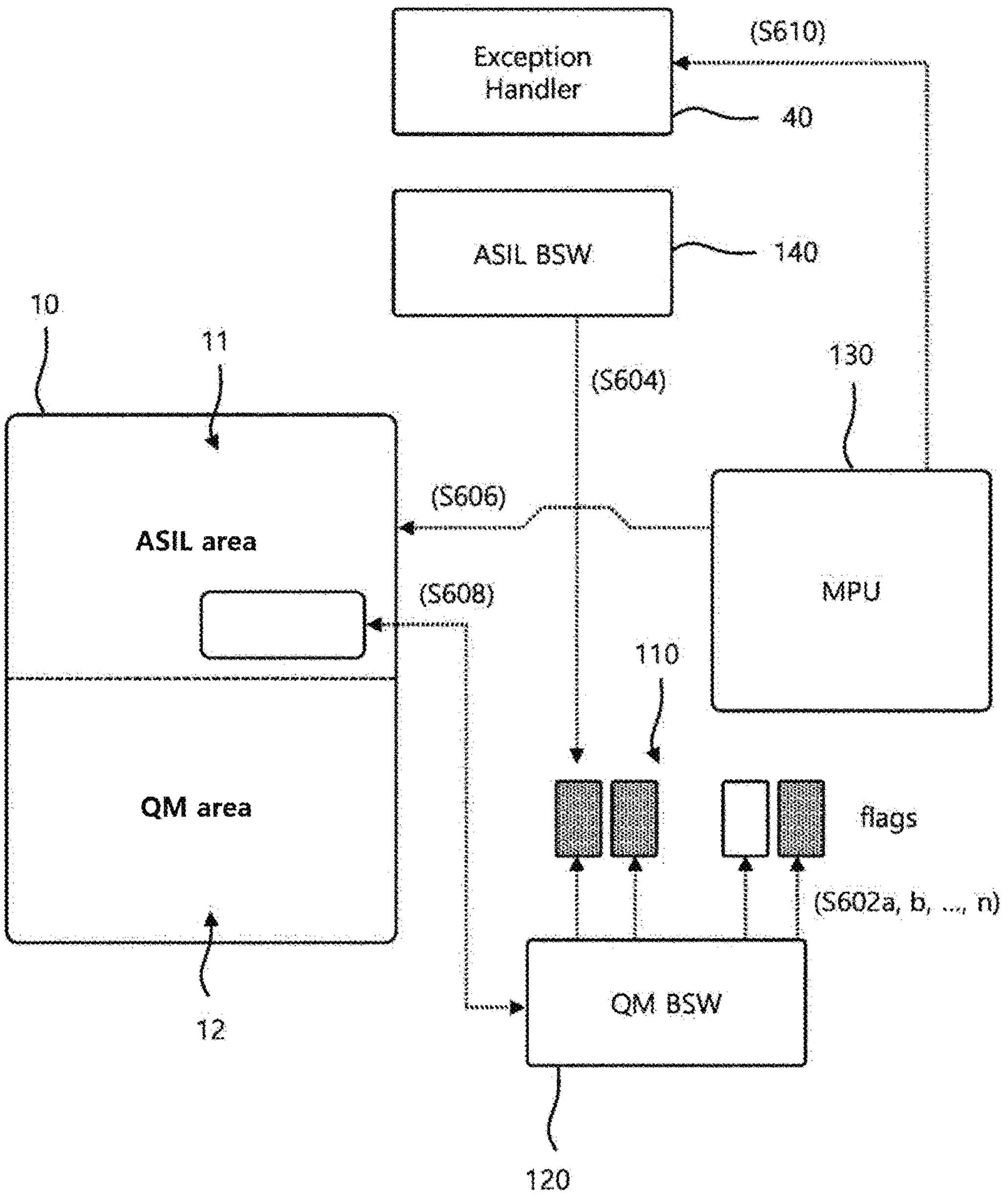
FIG. 6 is a flow diagram of a second example of control of an electronic device according to an embodiment.

FIG. 6 is a flow diagram of a second example of control of an electronic device according to an embodiment.

By referring to FIG. 6, hardware contamination related to the flags of the electronic device according to an embodiment is described in detail.

The QM module 120 may sets the multiple flags 110 to the first value (S602*a*, S602*b*, S602*n*) in order to acquire authority for access to the ASIL area 11. Here, one of the multiple flags 110 may not be set to the first value due to the hardware contamination. The hardware contamination may refer to a case where the flags are not set to a set value due to internal or external electronic waves generated during driving of an automobile.

When the flags are under the hardware contamination and the ASIL module 140 verifies the set values of the flags 110, because the ASIL module 140 may verify that all the multiple flags are not set to the first value, the ASIL module 140 may not deactivate the memory protection unit 130 (S604).

The memory protection unit 130 may monitor the memory access (S606), may block the memory access of the QM module 120 when the QM module 120 accesses certain areas of the ASIL area 11 (S608), and may generate an exception to provide it to the exception handler 40 (S610).

Therefore, as described with reference to FIG. 3, it is desirable that the multiple flags 110 are dispersed in multiple locations. For example, the multiple flags 110 may be multiple registers dispersed in locations, which are physically spaced apart from each other, to be used for state variables for memory access authority. The multiple flags 110 may be multiple memory areas dispersed in locations, which are physically spaced apart from each other, to be used for state variables for memory access authority. The multiple flags 110 may be physically spaced apart from each other in the QM area 12.

When the multiple flags 110 are dispersed in locations, which are physically spaced apart from each other, the QM module 120 may access the multiple flags 110 respectively at different times and may set the flags to the first value so as to acquire the authority for access to the ASIL area 11. For example, the QM module 120 may access a first flag and a second flag, which are dispersed, respectively at different times and set the flags to the first value so as to increase the safety for the memory access authority and secure the fluidity in memory access authority control.

Figure 7:
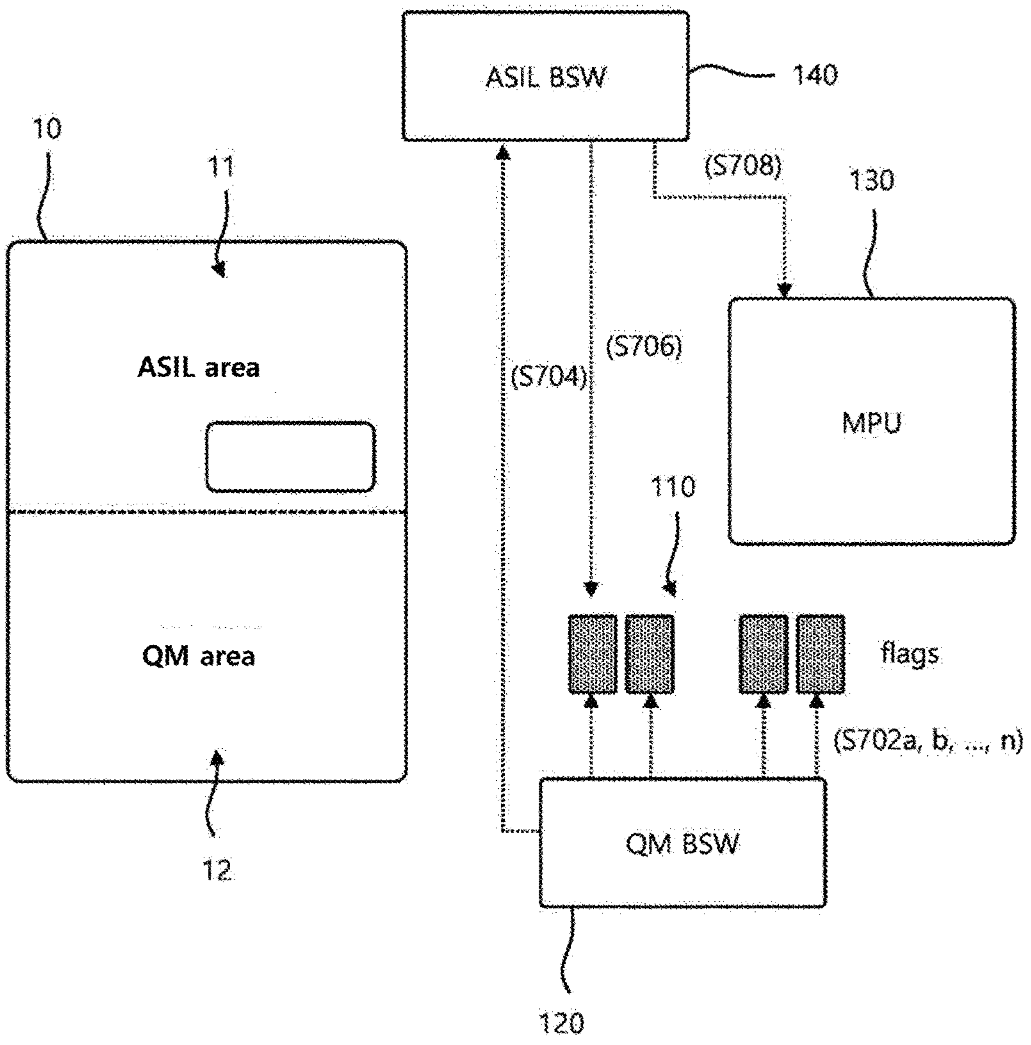
FIG. 7 is a flow diagram of a third example of control of an electronic device according to an embodiment.

FIG. 7 is a flow diagram of a third example of control of an electronic device according to an embodiment.

Referring to FIG. 7, the settings of the flags by the QM module or the notification by the QM module for completion of access to the ASIL area after the completion of access to the ASIL area are described in detail.

After having completed the access to the ASIL area 11, the QM module 120 may release the flags 110 by setting the flags 110 to the second value (S702*a*, S702*b*, . . . S702*n*) or may notify the completion of the memory access to the ASIL module 140 (S704). For example, the QM module 120 may set the flags 110 to the second value, which is '0', after having completed the memory access.

When verifying that the flags 110 are set to '0' (S706), the ASIL module 140 may deactivate the memory protection unit (MPU) 130, which monitors the memory access (S708).

Figure 8:
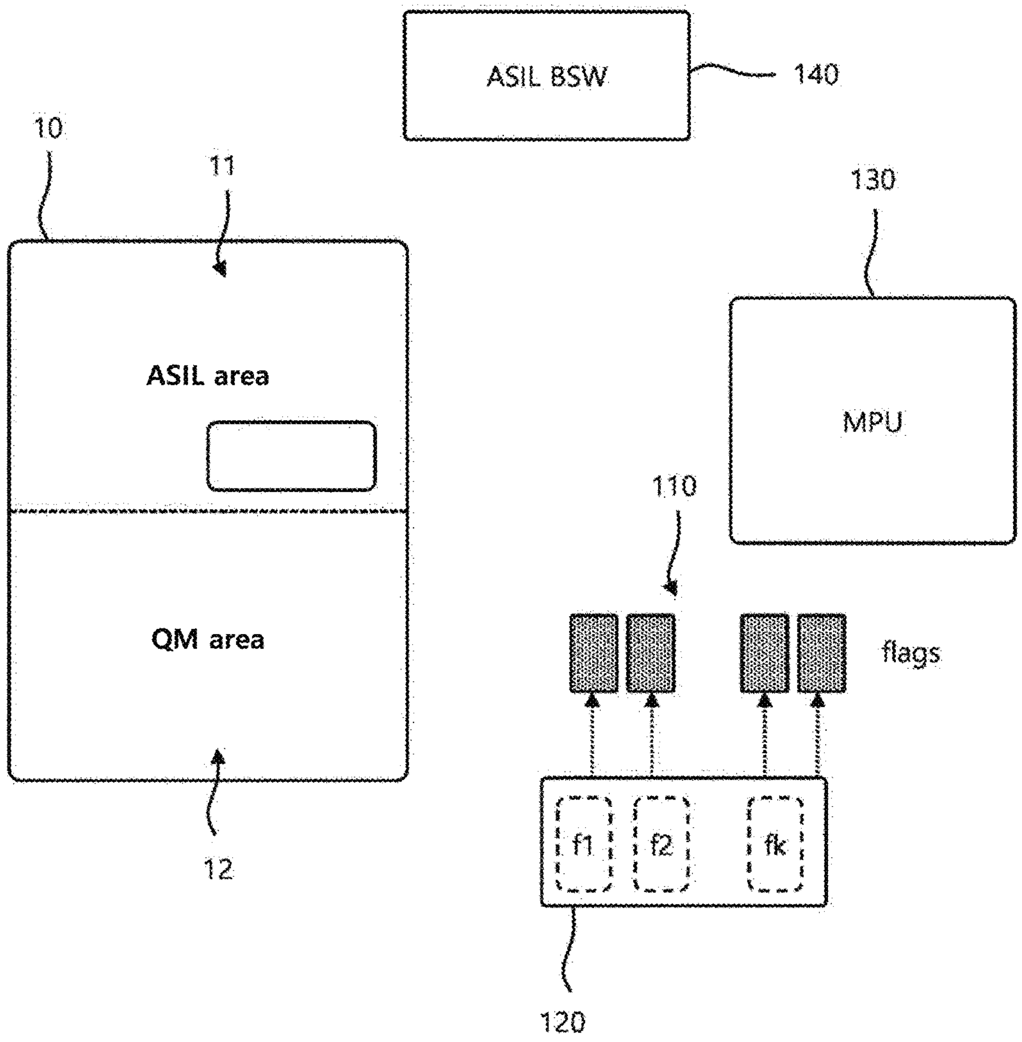
FIG. 8 is a diagram illustrating that multiple functions are included in a quality management (QM) module of an electronic device according to an embodiment.

FIG. 8 is a diagram illustrating that multiple functions are included in a QM module of an electronic device according to an embodiment.

Referring to FIG. 8, the QM module 120 of the electronic device according to an embodiment may include multiple functions f1, f2, . . . , fk. Each of the multiple functions f1, f2, . . . fk may independently access the ASIL area 11.

To do so, the QM module 120 may assign flags respectively to the multiple functions f1, f2, . . . fk. The multiple functions f1, f2, . . . , fk may set the flags 110, which respectively correspond to the multiple functions f1, f2, . . . , fk, to the first value or the second value to secure or return the memory access authority. The first value and the second value for the flags may be different from each other. For example, if the first value is '1', the second value may be '0'.

When the multiple functions f1, f2, . . . , fk included in the QM module 120 set the flags 110 for the memory access, the QM module 120 may perform the memory access after all the flags 100 have been set in order to prevent conflicts between the functions due to the flag settings.

In an embodiment described above, the method for protecting the ASIL memory area in the electronic device according to an embodiment, in which a component to release flags is the QM module, is described as an example. However, the component to release the flags is not limited to the QM module in the method for protecting the ASIL memory area in the electronic device.

According to an embodiment, in the method for protecting the ASIL memory area in the electronic device, the component to release the flags may be the ASIL module. For example, the method for protecting the ASIL memory in the electronic device may comprise setting flags to the first value, notifying a state change, deactivating the memory protection unit, performing memory access, notifying completion of the memory access, and activating the memory protection unit.

In setting flags to the first value, the QM module 120, which is accessible to the QM area 12 of the memory 10, may set the flags 110 to the first value. In notifying a state change, the QM module 120 may notify state changes of the flags 110 to the ASIL module 140, which is accessible to the ASIL area 11 of the memory. In deactivating the memory protection unit, the ASIL module 140 may deactivate the memory protection unit 130 that monitors access to the memory 10 when the flags 110 are set to the first value. In performing memory access, the QM module 120 may perform memory access, in which the QM module accesses the ASIL area 11. In notifying completion of the memory access, the QM module 120 may notify the completion of the memory access to the ASIL module 140. In activating the memory protection unit, the ASIL module 140 may activate the memory protection unit 130.

The method may further include setting the flags 110 to the second value by the QM module 140 after notifying, by the QM module 120, the completion of the memory access to the ASIL module 140. Additionally, the method may further include setting the flags 110 to the second value by the QM module 120 before or after notifying, by the QM module 120, the completion of the memory access to the ASIL module 140.

The first value and the second value for the flags 110 may be different from each other. For example, the first value may be '1' and the second value may be '0'. The QM module 120 may include multiple functions f1, f2, . . . , fk, and the flags 110 may be commonly used by the respective functions. The flags 110 may be located in registers, where there are possibilities to be contaminated in terms of hardware. The memory protection unit 130 may generate, in a state of being activated, an exception when the QM module 120 accesses the ASIL area 11.

The terms "include", "configure", and "have" described above mean that a component may be included unless otherwise specifically stated. Therefore, the terms should be construed as further including other components rather than excluding the other components. All terms including technical or scientific terms have the same meaning as generally understood by those having ordinary skill in the art to which the present disclosure pertains, unless otherwise defined. Terms commonly used, such as terms defined in a dictionary, should be construed as being consistent with the meaning in the context of the related art and should not be construed in an ideal or overly formal sense unless explicitly defined in the present disclosure.

The above description is merely intended to describe the technical idea of the present disclosure, and those having ordinary skill in the art to which the present disclosure pertains may make various modifications and variations without departing from the essential characteristics of the present disclosure. Therefore, the embodiments described in the present disclosure are not intended to limit the technical idea of the present disclosure but are intended to explain the technical idea, and the scope of the technical idea of the present disclosure is not limited by these embodiments. The scope of protection of the present disclosure should be construed by the claims below, and all technical ideas within the equivalent scope should be construed as being included in the scope of the rights of the present disclosure.

What is claimed is:

1. An electronic device comprising:

a memory configured to be partitioned into an automotive safety integrity level (ASIL) area and a quality management (QM) area;

multiple flags disposed at positions spaced apart from each other;

a QM module configured to:

respectively access the multiple flags at different times to set all of the multiple flags to a first value;

perform memory access of writing or reading data in certain areas of the ASIL area, wherein access of the QM module to the ASIL area is limited to the certain areas of the ASIL area; and set the multiple flags to a second value after having performed the memory access; and an ASIL module configured to:

deactivate a memory protection unit (MPU) configured to monitor access to the memory in response to determining that all of the multiple flags are set to the first value; and activate the MPU in response to determining that at least one of the multiple flags is set to the second value.

2. The electronic device of claim 1, wherein the MPU is configured to generate, in a state of being activated, an exception when the QM module accesses the ASIL area.

3. The electronic device of claim 1, wherein the ASIL module is configured to access the ASIL area and the QM area.

4. The electronic device of claim 1, wherein when changing set values of the multiple flags, the QM module is configured to notify the change to the ASIL module.

5. A method for protecting an automotive safety integrity level (ASIL) memory area, the method comprising:

respectively accessing multiple flags disposed at positions spaced apart from each other at different times by a quality management (QM) module to set all of the multiple flags to a first value, wherein the QM module is accessible to a QM area of a memory;

checking set values of the multiple flags by an ASIL module, wherein the ASIL module is accessible to an ASIL area of the memory;

deactivating a memory protection unit (MPU) configured to monitor access to the memory in response to determining that all of the multiple flags are set to the first value;

performing memory access of writing or reading data in certain areas of the ASIL area, wherein access of the QM module to the ASIL area is limited to the certain areas of the ASIL area;

setting at least one of the multiple flags to a second value by the QM module after having performed the memory access; and activating the MPU by the ASIL module in response to determining that at least one of the multiple flags is set to the second value.

6. The method of claim 5, further comprising:

locating the flags in positions spaced apart from each other across registers.

7. The method of claim 5, further comprising: respectively changing set values of the flags by multiple functions of the QM module.

8. The method of claim 5, further comprising:

locating the flags in the QM area; and accessing, by the ASIL module and the QM module, the flags without being authorized.

9. The method of claim 5, further comprising:

forming the QM area and the ASIL area by partitioning one memory device.

10. The method of claim 5, further comprising:

setting the ASIL area and the ASIL module to an ASIL D level.

11. The method of claim 5, further comprising:

activating the MPU or maintaining a state of the MPU in response to at least one of the flags not having the first value as a set value after checking the set values of the flags.

12. A method for protecting an automotive safety integrity level (ASIL) memory, the method comprising:

respectively accessing multiple flags disposed at positions spaced apart from each other at different times by a quality management (QM) module to set all of the multiple flags to a first value, wherein the QM module is accessible to a QM area of a memory;

notifying, by the QM module, state changes of the multiple flags to an ASIL module, wherein the ASIL module is accessible to a ASIL area of the memory;

deactivating, by the ASIL module, a memory protection unit (MPU) configured to monitor access to the memory in response to the multiple flags being set to the first value;

performing memory access of writing or reading data in certain areas of the ASIL area, wherein access of the QM module to the ASIL area is limited to the certain areas of the ASIL area;

setting at least one of the multiple flags to a second value by the QM module after having performed the memory access;

notifying, by the QM module, completion of the memory access to the ASIL module; and activating the MPU by the ASIL module in response to determining that at least one of the multiple flags is set to the second value.

13. The method of claim 12, wherein the QM module includes multiple functions and the flags are commonly used by the multiple functions.

14. The method of claim 12, further comprising:

locating the flags in registers where there are possibilities to be contaminated in terms of hardware.

15. The method of claim 12, further comprising:

generating, by the MPU, in a state of being activated, an exception in response to the QM module accessing the ASIL area.

* * * * *